(12) United States Patent
Todd et al.

(10) Patent No.: US 11,519,830 B2
(45) Date of Patent: Dec. 6, 2022

(54) ACTIVE GRINDING MEDIA FOR PROCESSING SAMPLES

(71) Applicant: OMNI INTERNATIONAL, INC., Kennesaw, GA (US)

(72) Inventors: William Z. Todd, Kennesaw, GA (US); Karl Jahn, Kennesaw, GA (US)

(73) Assignee: OMNI INTERNATIONAL, INC., Kennesaw, GA (US)

( * ) Notice: Subject to any disclaimer, the term of this patent is extended or adjusted under 35 U.S.C. 154(b) by 312 days.

(21) Appl. No.: 16/940,025

(22) Filed: Jul. 27, 2020

(65) Prior Publication Data

US 2021/0025792 A1 Jan. 28, 2021

Related U.S. Application Data

(60) Provisional application No. 62/980,638, filed on Feb. 24, 2020, provisional application No. 62/879,087, filed on Jul. 26, 2019.

(51) Int. Cl.
*B02C 17/24* (2006.01)
*G01N 1/28* (2006.01)
(Continued)

(52) U.S. Cl.
CPC .............. *G01N 1/286* (2013.01); *B02C 17/04* (2013.01); *B02C 17/20* (2013.01); *B02C 17/24* (2013.01); *G01N 2001/2866* (2013.01)

(58) Field of Classification Search
CPC ......... B02C 17/20; B02C 17/04; B02C 17/24; B02C 17/14; G01N 1/286; G01N 2001/2866
See application file for complete search history.

(56) References Cited

U.S. PATENT DOCUMENTS 1,169,075 A * 1/1916 Gerlach .................. B02C 17/20
241/102
1,388,462 A * 8/1921 Hardinge ................ B02C 17/20
144/208.7
(Continued)

FOREIGN PATENT DOCUMENTS

GB 261664 A * 11/1926 ............. B02C 17/20
GB 274786 A * 7/1927 ............. B02C 17/20
(Continued)

OTHER PUBLICATIONS

BlenderBottle Classic Loop Top Shaker Bottle, 11 pgs, Published before Jul. 25, 2020.
(Continued)

*Primary Examiner* — Faye Francis
(74) *Attorney, Agent, or Firm* — Gardner Groff & Greenwald, PC

(57) ABSTRACT

An active/resilient grinding media inside a tube containing a sample is oscillated rapidly by a homogenizer so that the active media is driven in a first direction until it impacts a first end of the tube, which causes it to deform and store an energy charge as it decelerates and stops, and it then accelerates rapidly in the second opposite direction under the discharging force of the stored energy toward the opposite second end of the tube. This cycle of the active media decelerating/charging and then discharging/accelerating is repeated throughout the entire oscillatory processing of the sample. The result is much higher velocities of the active media and therefore much greater impact forces when the sample and active media collide, producing increased efficiency in disruption and size-reduction of the sample particles.

17 Claims, 5 Drawing Sheets

(51) Int. Cl.
  *B02C 17/04* (2006.01)
  *B02C 17/20* (2006.01)

(56) References Cited

U.S. PATENT DOCUMENTS

| | | | | |
|---|---|---|---|---|
| 1,388,463 A * | 8/1921 | Hardinge | ............... | B02C 17/20 126/36 |
| 1,393,334 A * | 10/1921 | Bachman | ............... | B02C 17/20 241/184 |
| 1,431,475 A * | 10/1922 | MacDonald | ............ | B02C 17/20 451/328 |
| 1,700,667 A * | 1/1929 | Bues | ..................... | B02C 17/20 241/184 |
| 1,720,024 A * | 7/1929 | Young | ..................... | B02C 17/20 241/184 |
| 1,860,393 A * | 5/1932 | Newhouse | ............. | B02C 17/20 241/184 |
| 1,864,542 A * | 6/1932 | Eberhardt | .............. | B02C 17/20 241/184 |
| 2,558,327 A * | 6/1951 | Weston | ................. | B02C 17/20 241/184 |
| 2,653,769 A * | 9/1953 | Hall | ....................... | B02C 17/10 241/137 |
| 2,847,169 A * | 8/1958 | William | ................. | B02C 17/20 134/169 R |
| 3,027,104 A * | 3/1962 | Hall | ....................... | B02C 17/10 241/176 |
| 3,027,105 A * | 3/1962 | Hall | ....................... | B02C 17/20 451/328 |
| 3,124,314 A * | 3/1964 | Klein | ..................... | B02C 17/04 241/172 |
| 4,779,809 A * | 10/1988 | Miwa | ..................... | B02C 17/14 241/179 |
| 5,968,213 A * | 10/1999 | Tseng | ..................... | B24B 31/14 51/293 |
| 6,070,817 A * | 6/2000 | Yanase | ................... | B02C 17/20 241/179 |
| 6,293,480 B1 * | 9/2001 | Tseng | ..................... | B02C 17/14 241/184 |
| 7,731,111 B2 * | 6/2010 | Roy | ........................ | A01G 23/00 241/28 |
| D743,457 S * | 11/2015 | Bodurov | ................. | D15/126 |
| 2007/0243018 A1 * | 10/2007 | Roy | ........................ | B02C 17/04 405/16 |
| 2008/0223962 A1 * | 9/2008 | Kemppainen | .......... | B02C 17/10 241/2 |
| 2011/0297775 A1 * | 12/2011 | Bodurov | ................. | B02C 17/20 241/291 |
| 2021/0237094 A1 * | 8/2021 | Shelley | .................. | B02C 25/00 |

FOREIGN PATENT DOCUMENTS

| | | | | |
|---|---|---|---|---|
| GB | 326656 A * | 3/1930 | ............. | B02C 17/20 |
| KR | 100798948 B1 * | 7/2007 | ............. | B02C 17/20 |

OTHER PUBLICATIONS

OMNI 0.5 mm Ceramic Beads Bulk, 1 pg, Published before Jul. 25, 2020.

* cited by examiner

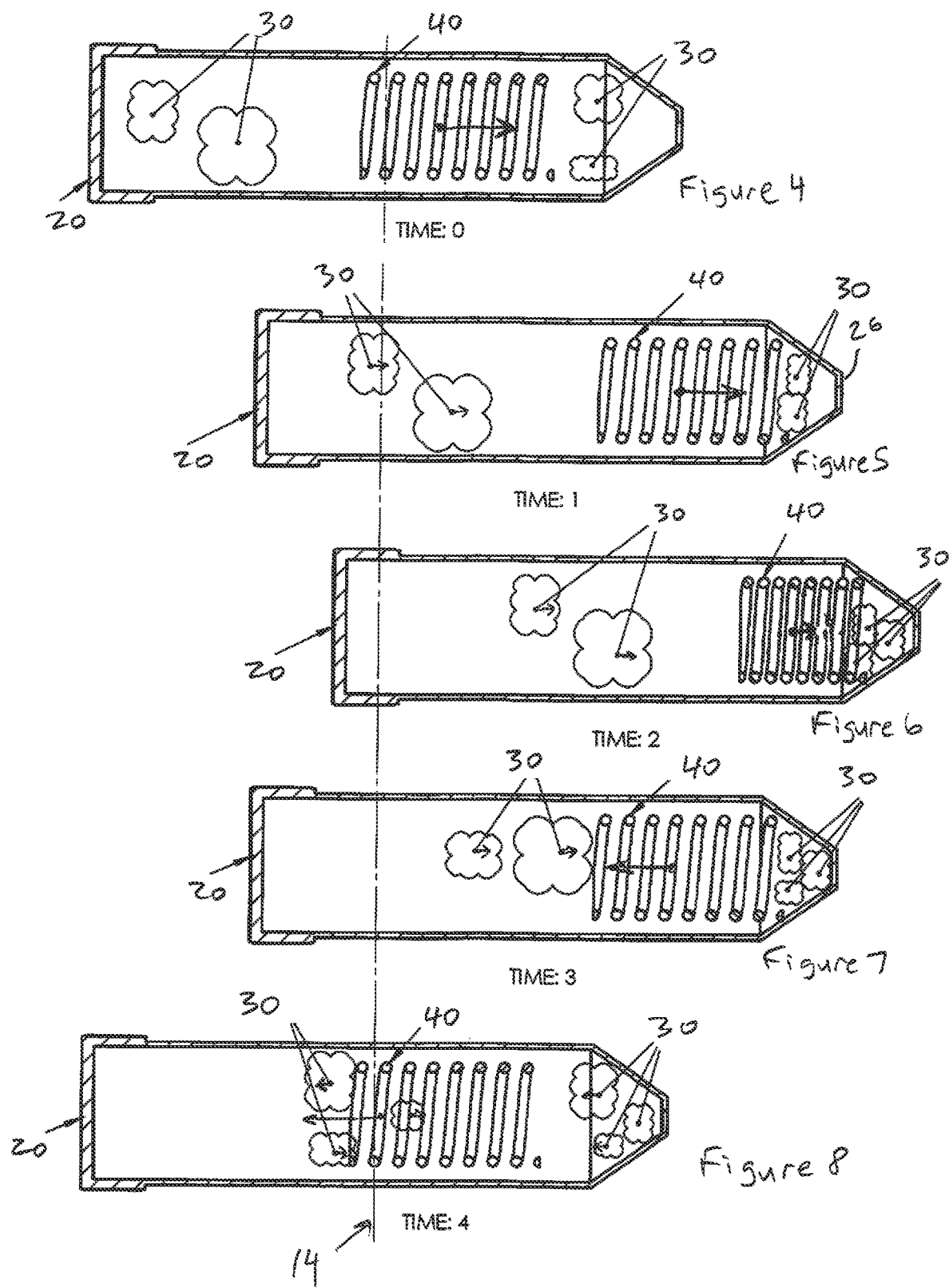

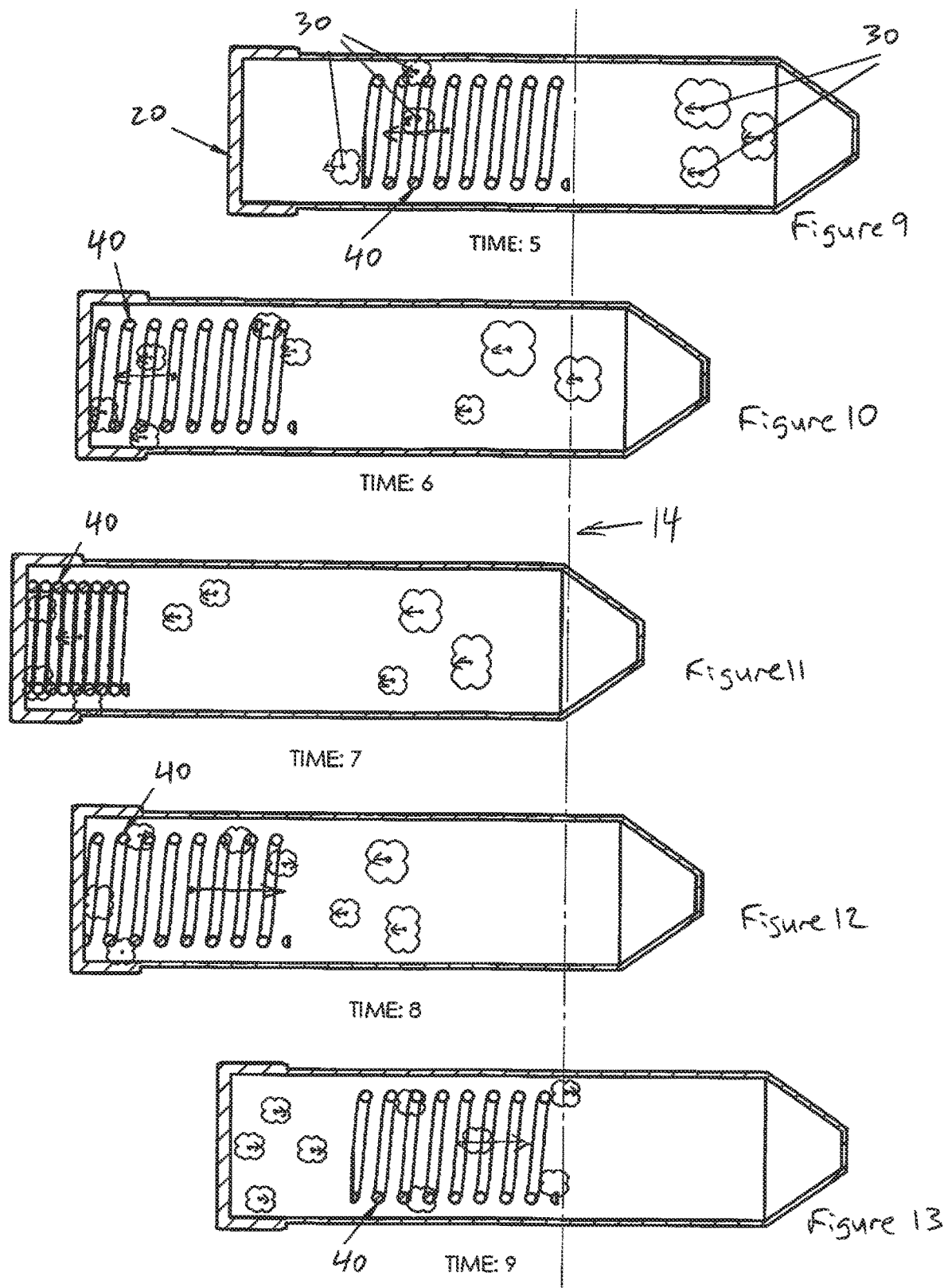

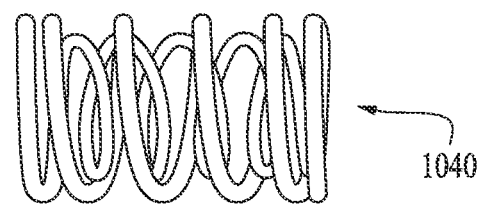
Figure 23
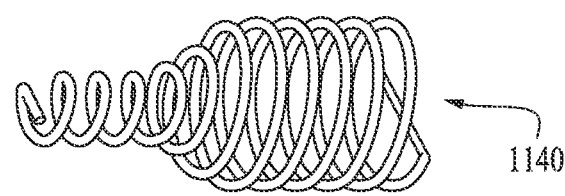
Figure 24
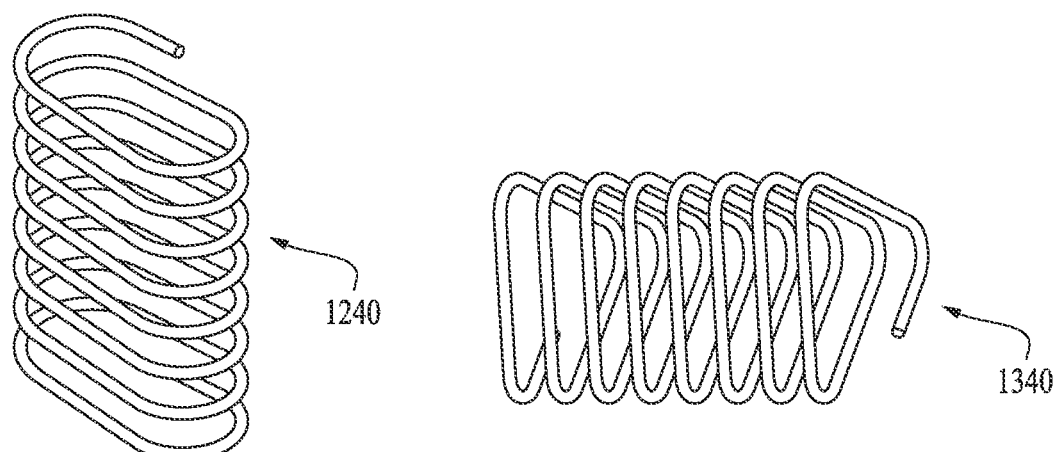
Figure 25
Figure 26

ACTIVE GRINDING MEDIA FOR PROCESSING SAMPLES

CROSS-REFERENCE TO RELATED APPLICATION

This application claims the priority benefit of U.S. Provisional Patent Application Ser. No. 62/980,638, filed Feb. 24, 2020, and U.S. Provisional Patent Application Ser. No. 62/879,087, filed Jul. 26, 2019, which are hereby incorporated herein by reference.

TECHNICAL FIELD

The present invention relates generally to laboratory devices and accessories for homogenizing sample materials, and particularly to such laboratory homogenizing devices, sample tubes, and grinding media.

BACKGROUND

Homogenization involves disaggregating, mixing, resuspension, or emulsifying the components of a sample using a high-shear process with significant micron-level particle-size reduction of the sample components. Homogenization is commonly used for a number of laboratory applications such as creating emulsions, reducing agglomerate particles to increase reaction area, cell destruction for capture of DNA material (proteins, nucleic acids, and related small molecules), DNA and RNA amplification, and similar activities in which the sample is bodily tissue and/or fluid, other organic material, or another substance.

One type of laboratory homogenization equipment is bead milling devices. In traditional bead milling devices, the sample is contained within a tube along with grinding media to grind, disrupt, or reduce the particle size of the sample upon being driven through an oscillatory motion at extremely high velocities. Typically, this grinding media is comprised of flow-interfering beads (e.g., pellets or particles) made of a material (e.g., glass, ceramic, metal, mineral, or plastic) that is significantly harder than the sample being processed and subject to forces and accelerations from impacting the ends of the tube as it oscillates, causing repeated impacts between media and sample. While conventional grinding media, and homogenization methods using them, have their benefits, further improvements in this technology are desirable.

Accordingly, it can be seen that needs exist for improvements in grinding media and methods for processing samples. It is to the provision of such solutions that the present invention is primarily directed.

SUMMARY

Generally described, the present invention relates to an active/resilient grinding media held inside a tube containing a sample, with the tube oscillated rapidly by a homogenizer so that the active media is driven in a first direction until it impacts a first end of the tube, which causes it to deform and store an energy charge as it decelerates and stops, and it then accelerates rapidly in the second opposite direction under the discharging force of the stored energy toward the opposite second end of the tube. This cycle of the active media decelerating/charging and then discharging/accelerating is repeated throughout the entire oscillatory processing of the sample. The result is much higher velocities of the active media and therefore much greater impact forces when the sample and active media collide, producing increased efficiency in disruption and size-reduction of the sample particles.

The specific techniques and structures employed to improve over the drawbacks of the prior art and accomplish the advantages described herein will become apparent from the following detailed description of example embodiments and the appended drawings and claims.

BRIEF DESCRIPTION OF THE DRAWINGS

FIGS. 4-13 show the tube, active grinding media, and sample of FIG. 2 used in a homogenizing process, with each figure showing a sequentially advanced position during the homogenizer-driven reciprocating motion of the tube, sample, and active grinding media.

FIGS. 14a-26 show additional active grinding media according to various respective example embodiments, with FIGS. 14a and 14b being side and end views, respectively, with FIGS. 15-23 being side views, and with FIGS. 24-26 being perspective views.

DETAILED DESCRIPTION OF EXAMPLE EMBODIMENTS

Figure 1:
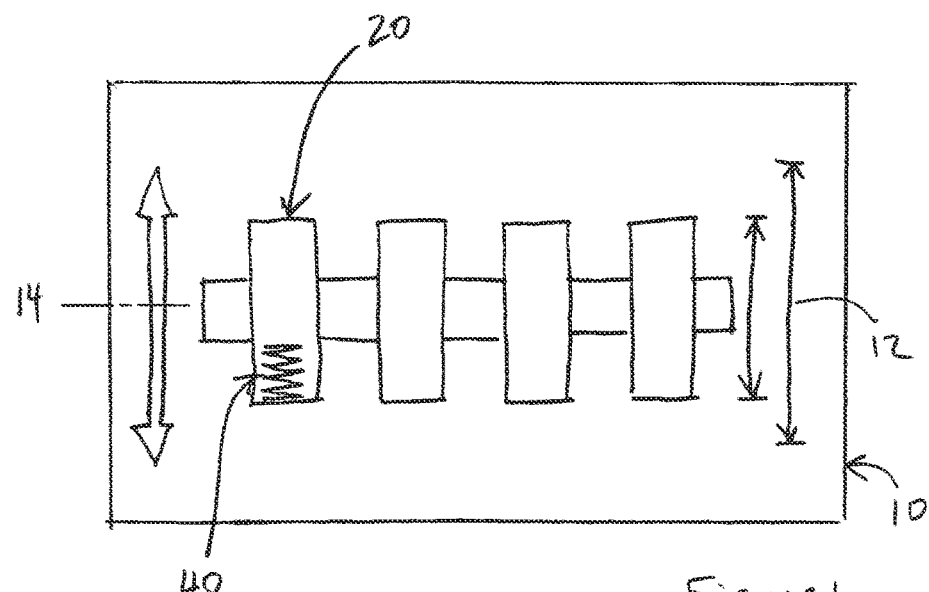
FIG. 1 is a schematic diagram of a homogenizing system according to an example embodiment, showing a homogenizer holding four sample tubes, with one of the tubes holding an active grinding media.

The present invention relates to improved homogenization processing using a homogenizer, a sample tube, and an innovative resilient grinding media. The resilient grinding media stores and releases energy, and impacts the sample while enabling the sample to flow past it, during each oscillation cycle inside the tube to dramatically improve processing of the sample. As such, the resilient grinding media are referred to herein as an "active" (or "dynamic") media (aka "energy-storage devices") because the storage and release of energy causes the grinding media to travel at speeds and accelerations greater (typically much greater) than the tube and/or the sample, and to change oscillatory directions within the tube sooner (typically much sooner greater) than the sample, to deliver greater (typically much greater) impact forces to the sample. This produces a dramatic effect and improvement in the processing of the sample. This is in contrast to conventional grinding media, which are intentionally made of extremely rigid/hard materials that in homogenizing use absorb no (or relatively negligible) energy in order to maximally transfer their kinetic energy to the sample material being processed (e.g., when multiple of the grinding media impact each other and/or the tube end and between them shear the sample), which therefore are only accelerated as greatly as the tube is accelerated when they together reverse direction in their oscillatory motion, and which therefore change oscillatory directions together with the sample being processed. Because of these characteristics of conventional grinding media, they can be referred to as "passive" media.

A few preliminary definitions are as follows. "Homogenizing" and "processing" as used herein are intended to be synonymous and broadly construed to mean particle-size reduction of a sample by high-shear disaggregating, mixing, resuspending, and/or emulsifying (i.e., separation, not destruction) of the components of the sample by an axially/linearly reciprocating/oscillating shaking motion of the tubes containing the samples (sometimes referred to as "milling").

"Homogenizer" (aka "homogenizing device") as used herein is intended to be broadly construed to include any type of device that homogenizes/processes samples, including conventional high-powered shaker-mill (aka bead-mill) laboratory homogenizers (e.g., commercially available from OMNI International, Inc. under the brand name BEAD RUPTOR) and other laboratory equipment that is operable for homogenizing.

"Sample" as used herein is intended to be broadly construed to include any type of material that can be homogenized and for which homogenization could be useful, such as but not limited to human and/or non-human bodily fluid and/or tissue (e.g., blood, bone-marrow cells, a coronary artery segment, or a piece of an organ), other organic matter (e.g., plants or food), and/or other chemicals.

And "tube" is intended to be broadly construed to include any closable vessel or container that can hold a sample during homogenization and is not limited to conventional cylindrical hard-plastic vials ("diameter" as used herein is thus also intended to include another transverse chamber dimension for a non-cylindrical tube).

In various aspects, the invention relates to an active grinding media provided by itself for use with a sample tube and a homogenizer, an active grinding media and a tube provided together for use with a homogenizer, or a complete assembly including an active grinding media, a sample tube, and a homogenizer. In another aspect, the invention relates to a set of a plurality of the active grinding media with different configurations for customized selection of a particular one of the active grinding media for homogenizing a particular sample. And in yet another aspect, the invention relates to methods of homogenizing a sample by using a tube including an active grinding media.

The active grinding media has a grinding body made of a resiliently deformable (aka resilient) material such that it deforms and stores energy upon impacts, and in response it resiliently returns to its neutral form/shape/state as it discharges and releases the stored energy. In particular, the resilient active grinding media reciprocates within a longitudinal-axis processing tube that also contains a sample material and that is held and oscillated through an axially reciprocating motion by a homogenizing device. As such, when the tube is driven through the oscillatory motion, the active grinding media is driven in a first direction until it impacts a first end of the tube, which causes it to deform and store an energy charge as it decelerates and stops, and it then accelerates rapidly in the second opposite direction under the discharging force of the stored energy toward the opposite second end of the tube. This cycle of the active grinding media decelerating/charging then discharging/accelerating is repeated throughout the entire oscillatory processing of the sample. The result is much higher velocities of the active grinding media and therefore much greater impact forces when the sample and active grinding media collide. This in turn results in dramatically shorter processing times with less heat generated, both very important benefits to sample processing.

In typical embodiments, the resiliently deformable material is a metal (e.g., spring wire), plastic, rubber (e.g., hard rubber), other resilient material, or a composite. In some embodiments, the entire grinding body is made of the resilient material, with the material selected with a resiliency so that the grinding body deforms upon impacts with the tube ends (and resiliently returns/undeforms afterwards) but does not deform (or only negligibly does so) upon impacts with the sample material. As such, the material selection for a given homogenizing process can be based in part of the rigidity/hardness (or resiliency/softness) of the tube to be used as well as the mass and density of the sample to be processed. In other embodiments, a portion of the grinding body is made of the resilient material (selected for energy storage and release) and at least one other portion of the grinding body is made of a rigid material (selected for transferring kinetic energy to the sample). For example, in some embodiments the grinding body includes two longitudinally opposite end portions (with impact surface areas) that are made of a rigid material and a longitudinally intermediate portion (between the ends) that is made of the resilient material.

The resilient material (and optional additional rigid material) of the grinding body can be further selected with a resiliency (as well as a mass, density, size and shape) so that in use it has a sufficiently high acceleration and velocity that it accelerates and travels faster than the tube and faster than the sample. In particular, the active grinding media has an average speed (including relatively higher acceleration and velocity initially after discharging at the tub first end and relatively slower acceleration and velocity later just before impacting the tube opposite second end) that is greater than the average speed of the tube or sample. As such, the active grinding media typically impacts the tube ends before the tube changes directions (i.e., momentarily stops and reverses direction from the first direction to the second opposite direction in its oscillatory reciprocating motion cycle), or at least before the sample impacts the tube ends. In other embodiments, the active grinding media is configured and selected so that it impacts the tube ends at the same time or after the tube changes directions, depending for example on the sample being processed (e.g., some sample types and volumes provide more resistance to motion of the active grinding media), the homogenizer speed setting (e.g., some active grinding media of greater mass might require slower oscillatory speeds), the tube (inner/chamber) length (and thus the available travel of the active grinding media), and the tube travel distance/length (as driven by the travel stroke of the particular homogenizer being used).

Because of the use of the resilient material, the active grinding media has a higher acceleration immediately after its travel direction reversal (from the first direction to an opposite second direction) than just before its impact with the tube end. Also, because the active grinding media has a greater average velocity (and greater mass) than the sample, this direction reversal of the active grinding media occurs while at least some pieces of the sample are still traveling in the first direction. The combination of these two features results in higher impact velocities and greater impact forces transmitted from the active grinding media to the sample. This is because the active grinding media is traveling in the second direction when it impacts at least some of the sample pieces still moving in the opposite first direction, so the relative speed of the active grinding media (relative to the sample traveling in the opposite direction) is greater than the actual speed of the active grinding media. And this is further because the active grinding media is accelerating in the second direction when it impacts at least some of the sample pieces still moving in the opposite first direction, with this acceleration increasing the force that the mass of the active grinding media impacts and imparts to the sample.

In addition, the configuration and (resilient) material of the active grinding are typically selected to have a total mass that is greater than the mass of the sample being processed, though it can be less than the sample mass in some cases. For example, the active grinding media body has a mass that is typically at least about 75% of the mass of the sample and typically no more than about 200% of the sample mass. A greater-mass active grinding media (e.g., 100%-200%) is generally beneficial for processing relatively harder samples (e.g., bone), and a lower-mass active grinding media (e.g., 75%-100%) is generally beneficial for processing relatively softer samples (e.g., muscle).

The active grinding media is typically provided with a single grinding body configured for use by itself to process the sample in the tube, that is, with only one active grinding media in the tube with the sample at a time. Because of the single grinding body/mass traversing the tube, higher impact forces are imparted to the sample being processed (relative to a number of conventional smaller passive media particles). Also, with only a single grinding body in the tube at a time, it only contacts the tube and the sample (so there is no contacting of multiple grinding beads against each other).

In such single-body embodiments, the active grinding media is typically is elongate with an axial orientation relative to the tube and configured with proportions relative to the tube that promote a primarily axial orientation and translational movement of the active grinding media within the tube in order to maximize the impact forces it delivers to the sample. In particular, the active grinding media has an axial length that is the same as or greater than the inside diameter of the processing tube in order to prevent it reorienting to a perpendicular position with its axis perpendicular to the tube axis during translation within the tube. In example embodiments, the tube has an inner diameter of about 0.2 inches to about 2.0 inches, with the active grinding media selected with an axial length that is greater than the inner diameter of the corresponding tube it is to be used with. In this way, the active grinding media is maintained in a generally axial orientation relative to the tube axis during processing use. While the active grinding media in some embodiments might reorient somewhat and traverse the tube with its axis not necessarily parallel to the tube axis, it is nevertheless maintained oriented within an acute angle of the tube axis because of mechanical interference due to the active grinding media being too long to reposition to perpendicular to the tube axis. Because the active grinding media is ensured to be in its generally axial orientation when it impacts the tube ends, it can be used with longer tubes (relative to with conventional passive grinding media) operating at lower oscillation amplitudes (relative to with conventional passive grinding media). Also, the active grinding media length is selected, relative to the tube length and the homogenizer stroke distance, to ensure that the active grinding media impacts the ends of the tube at each oscillation. With the active media length, the tube length, the stroke length, and the spring constant selected to accommodate the full compression of the active media at each end of the stroke, the active media performs as desired.

In addition, the active grinding media body typically has a maximum width (transverse to the axial length) that is smaller than the inside diameter of the processing tube but large enough to promote the desired primarily axial translational movement (i.e., to limit the lateral and angular movement of the grinding body in the tube during oscillation by limiting a maximum angle from axial of the active grinding media body). In this way, there are fewer glancing impacts of the tube sidewalls by the active grinding media, which thereby maintains its momentum and the high impact forces it can deliver to the sample. Conventional homogenizing tubes have an inner/chamber diameter of about 0.2 inches to about 2.0 inches, and an inner/chamber length of about 0.2 inches to about 6.0 inches. In example embodiments, the active grinding media has a maximum width that is typically about 50% to about 80% of the tube inner diameter (e.g., about 0.1 inches to about 1.6 inches), for example about 65%. Also, the axial length of the active grinding media is typically enough greater than the tube inner diameter to promote the desired primarily axial translational movement. In example embodiments the active grinding media has a length that is typically about 100% to about 400% of the tube inner diameter (e.g., about 0.2 inches to about 8.0 inches), for example about 250%. The axial length of the active grinding media can also be up to about 90% of the tube length, which allows sufficient oscillatory travel within the tube for processing the sample.

Furthermore, the active grinding media body can be provided in a number of different shapes/forms. For example, the active grinding media body can be a coil compression spring with a central axial flow-through bore (annular space) and with end impact surfaces (annular) that contact the tube ends. In other embodiments, the active grinding media body is made of a resilient material in the form of a solid or hollow bead, ball, or block, a hollow spheroid with a peripheral shell made of a screen, mesh, or spring material, or another regularly or irregularly shaped solid, hollow, or perforated structure. For embodiments in which the grinding body does not have an axial orientation (e.g., spheroid shaped embodiments), the impact end surfaces (discussed below) are not fixed and instead are defined based on the particular orientation at the time of each impact).

The active grinding media body also typically has internal and/or external flow-through openings that provide a passageway for pieces of the sample to pass through or around the grinding body as they are oscillated at very high speeds. Such flow-through openings can include the axial internal annular space through a coil compression spring. Other embodiments include flow-through openings provided by internal pores, shafts, or other passageways, by external/surface notches or channels, by both internal and external flow-through openings, and/or by lateral flow-through openings connecting internal and external flow-through openings. For active grinding media having an axial travel orientation, the flow-through openings are typically axially arranged in the grinding body (including not just linear but also sinusoidal, undulating, and other regular and irregular passageway shapes and surfaces). Still other such flow-through openings can be formed by the gaps in a screen or mesh material forming a peripheral shell of a hollow grinding body.

In other embodiments, the active grinding media has multiple components/bodies for example including a non-resilient material component coupled to a resilient-material component, with the non-resilient material component being for example a solid mass or "slug" of material (e.g., with no flow-through openings) for a good impact surface area, and with the resilient-material component being for example a spring or other energy storage device (e.g., with flow-through openings).

In some embodiments, the active grinding media body has a cross-sectional impact area (e.g., transverse to the axial/longitudinal oscillatory direction) that is relatively small (relative to the collective cross-sectional impact surface area of numerous smaller conventional passive grinding media, i.e., not relative to the entire exposed surface area). For example, the cross-sectional impact area of the active grinding media can be less than about 0.035 in$^2$/gram (based on the mass of the active grinding media). Because of the increased acceleration and thus impact forces of the active grinding media, the smaller cross-sectional impact area can produce the same or better homogenizing effect. Also, the smaller cross-sectional impact surface area results in greater pressures and thus even greater forces transferred to the sample, thereby focusing these higher accelerations and forces on the sample being processed (i.e., the impact forces are even greater because the cross-sectional area is reduced).

The active grinding media can generate even further increased impact forces on the sample by selecting properties of the active grinding media body (e.g., spring constant, mass, and cross-sectional impact area) based on the oscillatory frequency the homogenizer is to be operated at. Thus, the pressure of the impacts can be fine-tuned by selectively choosing properties of the active grinding media to provide increased effectiveness and efficiency of the processing.

The active grinding media can be used with tubes not designed for containing as high processing forces (e.g., less-robust tubes intended for slower oscillatory speeds), because the impact between the active grinding media and the tube ends is cushioned as the active grinding media deforms/compresses (the active grinding media absorbs the energy to charge itself instead of that energy being transmitted to the tube end), thereby reducing the forces on the tube ends from impacts by the active grinding media. In other words, use of the active grinding media enables oscillating the samples in tubes at higher speeds than the tubes could be safely oscillated at with conventional passive grinding media. Also, instead of using reinforced tubes (with thicker sidewalls and ends to withstand bead beating forces) as is done when using conventional passive grinding media, use of the active grinding media enables use of conventional/standard unreinforced tubes.

Active grinding media provided in some forms, for example coil compression springs, have an annular cross-sectional impact area at each end. For use with such embodiments, the tube end (including one integral end and one end cap) can be selected with a corresponding annular portion that is rigid (to withstand the grinding body impacts at the end of the range of motion) and with the central portion that is less rigid (that cannot withstand the impacts). In some embodiments, the tube endcap has a center portion that is made of a material that is puncturable (e.g., by syringe) to enable for post-processing sample recovery without unscrewing and removing the cap.

For embodiments of the active media in the form of coil compression springs, the spring constant (defining the rate of compression) is typically selected to be proportional to the acceleration of the tube containing the active media and sample. In particular, the homogenizer can be set at a selected speed (also the tube oscillation speed)(with example homogenizers having speed settings between about 0.1 m/s and about 6.0 m/s) based on the type of sample to be processed, and then the spring constant can be selected so that the spring fully compresses at each impact with the tube ends for the selected tube oscillation speed. The spring constant is also relevant to the process of storing and releasing energy during the deceleration and acceleration of the tube, by which the resultant velocity causes impact energy to be imparted to the sample being processed. The same spring-constant selection applies to the selection of the resilient material for other (non-coil spring) embodiments. In addition, the coil compression springs can each be made of a coiled element having a circular or other (e.g., rectangular) cross-sectional shape, in a helically cylindrical or other (e.g., helical/spiral) configuration, and having uniform/even or varied longitudinal spacing.

Figure 2:
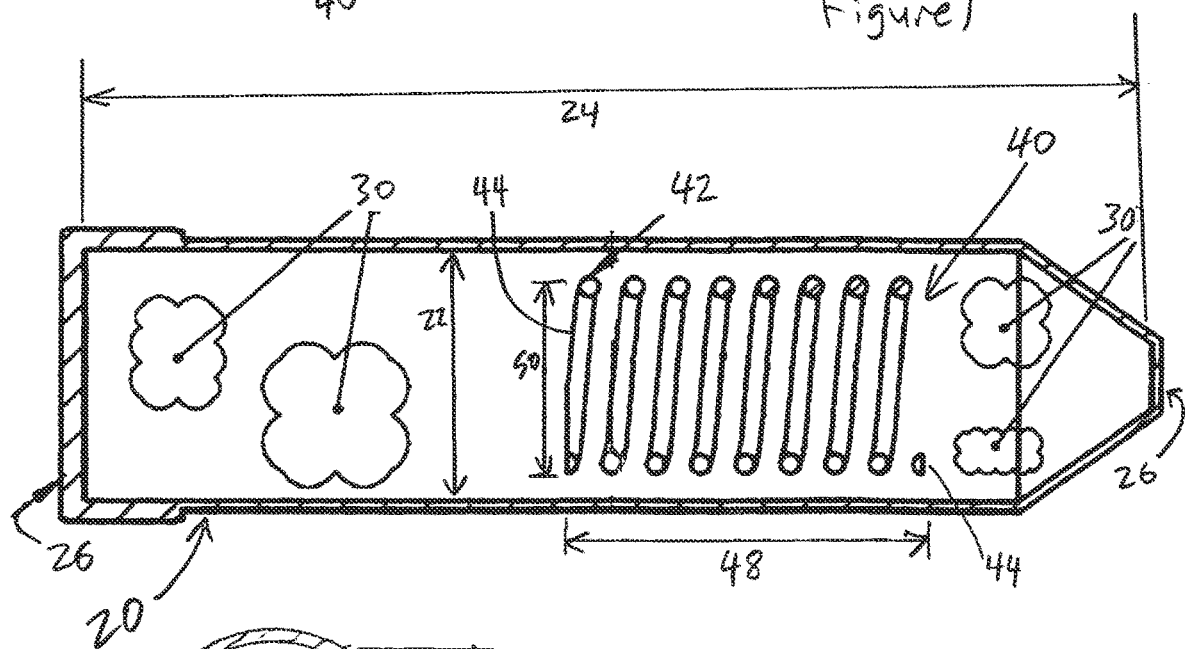
FIG. 2 is a longitudinal cross-sectional side view of the tube and active grinding media of FIG. 1, showing an unprocessed sample within the tube.
Figure 3:
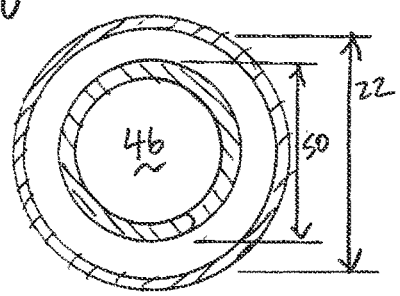
FIG. 3 is a transverse cross-section end view of the tube and active grinding media of FIG. 12, with the sample not shown for clarity of illustration.

Turning now to the drawing figures, FIG. 1-3 show a homogenizing system, including a homogenizer 10, a tube 20, a sample 30, and an active grinding media 40, according to an example embodiment. In particular, the homogenizer 10 includes a tube holder that is holding four sample tubes 20 (typical homogenizer holds one or multiple), with one of the tubes holding a sample 30 and an active grinding media 40. The homogenizer 10, tubes 20, and sample 30 can be of any conventional type, as defined above. The homogenizer 10 operates to generates an oscillatory stroke (as indicated by the linear double-headed arrow) having a stroke length (i.e., oscillatory amplitude or travel distance) 12, which is the same as the tube oscillation travel. And the tubes 20 each have a diameter (inner/chamber) 22 and a length (inner/chamber) 24, with the tube size selected for the particular sample to be processed. The tube length 24 is defined by the two opposite tube ends (one integral end and one endcap) 26. In typical embodiments, the homogenizer stroke length 12 is the same as or greater than the tube length 24 for good results, though the stroke length can be shorter in other embodiments.

The active grinding media 40 includes a grinding body in the form of a coil compression spring 42 made of a resilient material (e.g., spring steel). The spring body 42 includes a helically coiled element that is annular (e.g., hollow cylinder) and has an axial orientation, with annular end impact surfaces 44 (with a central compressible portion between them) that contact the tube ends 26 and the sample 30 during use, and with a central-bore flow-through opening 46 through which the sample 30 passes during use. The collapsible/compressible helical coil segments of the spring body 42 have a uniform longitudinal spacing and have a uniform radius. The structural features of the spring body 42 can be selected to provide the functionality and benefits described above.

The end impact surfaces 44 are at the axially opposite ends of the spring body 42 and include the annular cross-sectional surface area of the spring body ends (e.g., the respective outer/last coil segments of the helically coiled element). Also, the exposed surface area of the intermediate helical coil segments (between the ends of the spring body 42) define additional impact surfaces that contact the sample 30 during processing. Furthermore, the internal flow-through opening 46 of the spring body 42 includes the central annular space defined by the helically coiled element. Also, the gaps between the intermediate helical coil segments of the spring body 42 define additional flow-through openings for the sample 30 during processing (with these additional flow-through openings laterally/radially connecting the internal flow-through opening 46 to the exterior of the spring body 42 to form a circuitous flow path for increased flow and sample disruption).

The spring body 42 is elongate so that it oscillates within the tube 20 in a generally coaxial manner to enable good flow-through of the sample 30 through its internal axial opening 46 and is mechanically constrained from displacement from such coaxial orientation. In particular, the spring body 42 has an axial length 48 that is the same as or greater than the tube diameter 24 in order to prevent it from reorienting to a perpendicular position with its axis perpendicular to the tube axis during translation within the tube. For example, the axial length 48 of the spring body 42 can be proportionally greater than the tube diameter 24 by about 100% to about 200%. Furthermore, the spring body 42 has a maximum width 50 that is sized proportionally to the tube diameter 22 (for example, about 50% to about 80%) to promote primarily axial translational movement and minimize glancing impacts against the tube sidewalls.

FIGS. 4-13 show sequential positions of a processing system, including the tube 20, particles/pieces of the sample 30, and the active grinding media 40 of FIGS. 1-3, during use in a homogenizing process according to an example embodiment. In particular, these figures show a progression of sequential time steps for a complete cycle of oscillating motion, starting (Time 0) at the middle of a full speed cycle as the tube 20 is at the center of oscillatory motion 14. The indicated time steps are representative and not limited to any specific time increments or total time period. And the directional arrows of the active media 40 and the sample 30 have a length generally corresponding to velocity magnitude. As a preliminary step, the sample and the active grinding media are loaded into the tube, the tube is then sealed (e.g., the cap is secured on the tube open end), and the loaded tube is mounted to the homogenizer to be ready for use.

In FIG. 4 (Time 0), the tube 20 is centered at the center of the motion 14, the sample 30 is in an unprocessed state, and the active media 40 is in an unloaded state, with all these components traveling in a first direction.

In FIG. 5 (Time 1), the tube 20 has advanced past the center of motion 14, while the active media 40 has moved farther than the tube 20 (due to the higher acceleration and velocity of the active media 40, relative to the selected homogenizer stroke speed of the tube 20) or the unprocessed sample 30 (due to the higher mass, acceleration, and velocity of the active media 40). At this point in the motion cycle, the active media 40 has just contacted the tube end 26.

In FIG. 6 (Time 2), the tube 20 has decelerated and is now at a momentary stop, while the momentum of the active media 40 has transitioned (deformed) it into a loaded (compressed/charged) state. In this position, the active media 40 has impacted the sample 30 between the tube end 26 and the active media, causing it to be reduced in size (fewer larger pieces have been processed into more smaller pieces) due to the impact forces.

In FIG. 7 (Time 3), the active media 40 is releasing its stored energy and accelerating in the opposite second direction at a higher rate of acceleration than the tube 20.

In FIG. 8 (Time 4), the unloaded active media 40 has accelerated more rapidly than the tube 20 in the opposite second direction and has impacted pieces of the sample 30 still traveling in the first direction, resulting in higher-velocity and higher-force impacts.

In FIG. 9 (Time 5), the unloaded active media 40 under high acceleration continues to travel more rapidly than the tube 20, causing additional high-velocity impacts with the sample 30. Some pieces of the sample 30 may have not been reduced at this point, as they were not impacted during this cycle, but will be impacted and reduced on a future cycle.

In FIG. 10 (Time 6), the tube 20 is under deceleration and the active media 40 has just contacted the opposite end of the tube. Some pieces of the sample 30 may be located in the gaps between the collapsible coil sections of the active media.

In FIG. 11 (Time 7), the tube 20 has decelerated to zero and the active media 40 has transitioned (deformed) into a loaded state. Any pieces of the sample 30 that were located in the gaps between the collapsible coil sections of the active media are now crushed between the collapsible coil sections, further reducing the sample particle size.

In FIG. 12 (Time 8), the active media 40 is releasing its stored energy and accelerating back in the first direction. The accelerating active media 40 again causes high-velocity impacts during its traversal of the tube 20.

And in FIG. 13 (Time 9), the unloaded active media 40 has accelerated due to its stored energy release and is again traveling at a velocity higher than the tube 20.

FIGS. 14-26 each show an active grinding media according to various respective example embodiments. The active grinding media of these embodiments can have the same or similar structure and function as the embodiment of FIGS. 1-13, except as noted.

Figure 14A:
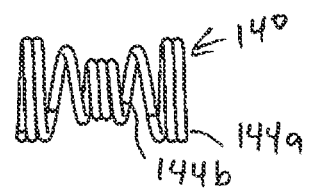
Figure 14B:
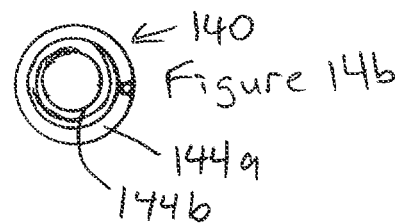

FIGS. 14a-14b show an active media 140 having two larger-diameter end portions and a smaller-diameter middle portion in an hourglass configuration. This provides a larger cross-sectional impact area for impacts during processing use, including the end impact areas 144a for impacting the tube ends and the sample, and additionally including intermediate impact areas 144b for impacting the sample (but not the tube ends). This also promotes axial translation of the active media 140 to reduce glancing impacts against the tube sidewalls.

Also, the helical coil segments can have a varied and/or even longitudinal spacing, for example those of the end and middle portions can have a first uniform longitudinal spacing (pitch) and those of connecting/transitioning portions (between the end and middle portions) can have a second uniform longitudinal spacing. The portions that are tightly coiled together (with little/less longitudinal spacing) have more mass than more loosely coiled portions, thereby increasing the mass so as to impart higher forces during energy storage and discharging and during impacting the sample.

Figure 15:

In FIG. 15 shows an active media 240 that is similar to that of FIGS. 14a-14b except with the middle portion having a greater axial length, the end portions having a shorter axial length. Also, the combined/total axial length being greater to enable providing a longer middle portion that is tightly coiled for increased mass/forces, as has been noted.

Figure 16:
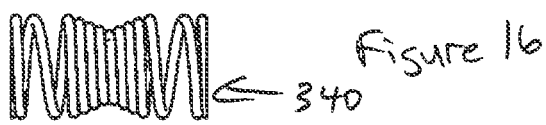

FIG. 16 shows an active media 340 that is similar to that of FIG. 15 except with the middle portion having a greater diameter, which allows larger particles/pieces of unprocessed sample to pass through the active media component during traversal of the tube, and which provides the active media with greater mass/forces.

Figure 17:
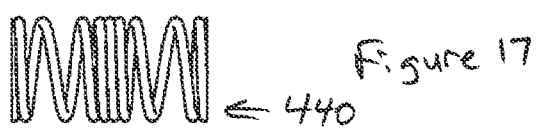

FIG. 17 shows an active media 440 that is similar to that of FIG. 2 except tighter longitudinal spacing of end and middle portions and looser longitudinal spacing of connecting/transitioning portions.

Figure 18:
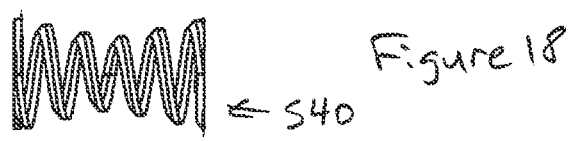

FIG. 18 shows an active media 540 that is similar to that of FIG. 2 except with an hourglass configuration (for increased impact surface area) and with the coiled element having a rectangular cross-sectional shape.

Figure 19:
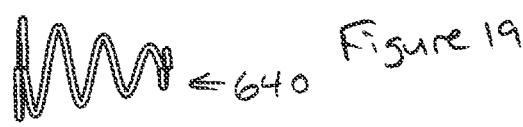

FIG. 19 shows an active media 640 that is similar to that of FIG. 2 except with a conical configuration (for increased impact surface area), with the coils having uniformly progressively smaller to larger diameter from end to end in a uniform-pitch helical spiral configuration.

Figure 20:
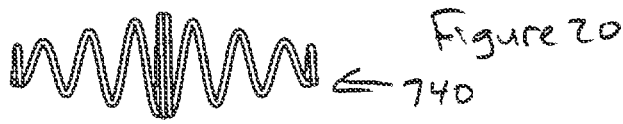

FIG. 20 shows an active media 740 that is similar to that of FIG. 19 except with a barrel configuration having two conical portions with the middle portion having a larger diameter than the end portions. Other embodiments have a barrel configuration with a curved side profile provided by the coils having a non-uniformly progressively smaller or larger diameter from end to end.

Figure 21:
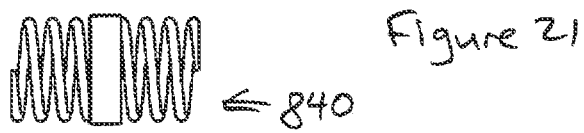

FIG. 21 shows an active media 840 that is similar to that of FIG. 2 except with a rigid central component between the ends of two aligned coil spring bodies. The spring bodies can be of any type described herein, not just that of FIG. 2. The rigid central component does not load/charge and unload/discharge, but it provides more mass for increased impact forces. As such, the depicted rigid central component is a band with an internal flow-through opening (annular space), though other embodiments can include other internal or external flow-through openings.

Figure 22:
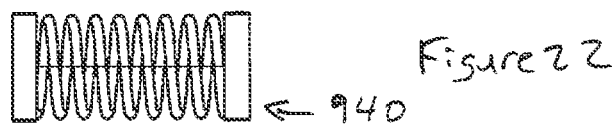

FIG. 22 shows an active media 940 that is similar to that of FIG. 19 except with two rigid components (e.g., bands) at the ends of a coil spring body. The bands can be made of a heavier material than the spring to provide the greater mass/weight and related benefits described above.

FIG. 23 shows an active media 1040 that is similar to that of FIG. 2 except with two coaxially arranged coiled spring body portions having different diameters to provide for increased impact area and energy charge/discharge.

FIG. 24 shows an active media 1140 that is similar to that of FIG. 23 except with two linearly arranged coiled spring body portions having different diameters to provide for increased impact area and energy charge/discharge.

FIGS. 25 and 26 show respective active media 1240 and 1340 that are similar to that of FIG. 2 except with a respective generally elliptical and generally triangular cross-sectional shape. Other embodiments have a spheroid configuration with a circularly curved side profile.

The active grinding media can be of any embodiments disclosed herein, including variations thereof, or of other embodiments, including other resiliently deformable, elongate, flow-through structures. In some embodiments the active media is in the form of other types of spring elements (e.g., leaf springs), hard outside/end elements (for impacting) interconnected by resilient inner elements (for energy storage and release), and/or other designs, and the flow-through feature can be provided by designs including hollow/sleeve, perforated, mesh, screen, grate, or another flow-through design arrangement. In other embodiments, the active media can be non-elongate, with an axial length less than the tube diameter, and with the tube including a track or guide system for engaging and guiding the active media along its oscillatory motion and maintained in its intended orientation with its internal and/or external passageways axially aligned for optimal flow-through of the sample.

In still other embodiments, the tubes can be provided with their two ends (e.g., one integral end and one endcap) including an inner layer made of a resiliently deformable material to provide the energy storage and discharge effect to grinding media, and can be used with the active grinding media and/or with conventional passive grinding media.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. An active grinding media configured to homogenize an organic sample in a homogenizing tube using a high-speed laboratory homogenizer, the active grinding media comprising:
   a grinding body having two opposite ends defining oppositely facing impact surfaces and having an intermediate compressible portion that is between the two ends and made of a resiliently deformable material, wherein the grinding body is configured to fit inside the tube along with the sample so that, when the tube is subjected to a high-velocity, longitudinal, oscillatory motion along a longitudinal axis of the tube during homogenizing use, the active grinding media travels in a first direction until a first one of the end impact surfaces impacts a first end of the tube, in response the intermediate compressible portion deforms and stores a first energy charge as it decelerates and stops, in response the active grinding media accelerates in a second opposite direction under a first discharging force of the intermediate compressible portion toward an opposite second end of the tube until a second opposite one of the end impact surfaces impacts the second end of the tube, in response the intermediate compressible portion deforms and stores a second energy charge as it decelerates and stops, and in response the active grinding media accelerates back in the first direction under a second discharging force of the intermediate compressible portion toward the first end of the tube to complete an oscillatory cycle, wherein the oscillatory cycle is repeated, and wherein during the oscillatory cycle the grinding body impacts the sample at accelerations and increased velocities to efficiently homogenize the sample,
   wherein the active grinding media body is configured for constraint in an axial orientation relative to the tube axis and within the tube, wherein the active grinding media body is elongate in the axial orientation, wherein the active grinding media body has a length that is 100 percent to 400 percent of an inner diameter of the tube so that the active grinding media body is maintained in the axial orientation during homogenizing use.

2. The active grinding media of claim 1, wherein the active grinding media body defines at least one flow-through opening through which the sample passes during the oscillatory motion of the active grinding media within the tube.

3. The active grinding media of claim 2, wherein the flow-through opening is formed internally through the active grinding media body.

4. The active grinding media of claim 1, wherein the active grinding media body has a width that is smaller than the tube inner diameter.

5. The active grinding media of claim 4, wherein the active grinding media body width is 50 percent to 80 percent of the tube inner diameter.

6. The active grinding media of claim 1, wherein the active grinding media body is a coil compression spring.

7. A processing system comprising, in combination, the active grinding media and the tube of claim 1.

8. A method of using the active grinding media of claim 7 to homogenize the sample, comprising:
   loading the sample and the active grinding media into the tube, then sealing the tube;

mounting the sealed tube containing the sample and the active grinding media to the high-speed laboratory homogenizer; and operating the high-speed laboratory homogenizer through one or more of the oscillatory cycles until the sample is homogenized.

9. The method of claim 8, wherein the step of operating the high-speed laboratory homogenizer includes selecting a speed setting of between 0.1 m/s and 6.0 m/s.

10. An active grinding media configured to homogenize an organic sample in a homogenizing tube using a high-speed laboratory homogenizer that generates a high-velocity longitudinal oscillatory motion, the active grinding media comprising:

a grinding body in the form of a coil compression spring including helical coil segments in an annular arrangement, wherein the grinding body has two opposite ends, an intermediate compressible portion between the two ends, and a flow-through opening extending end-to-end therethrough, wherein the two opposite ends are annular and formed by two outermost of the coil segments and define oppositely facing impact surfaces, wherein the intermediate compressible portion is formed by one or more intermediate ones of the coil segments between the two outermost coil segments and is made of a resiliently deformable material, wherein the flow-through opening extends internally through the annular grinding body to enable passage therethrough of the sample during the oscillatory motion of the active grinding media within the tube, wherein the grinding body is configured to fit inside the tube along with the sample so that, when the tube is subjected to the high-velocity, longitudinal, oscillatory motion along a longitudinal axis of the tube during homogenizing use, the active grinding media travels in a first direction until a first one of the end impact surfaces impacts a first end of the tube, in response the intermediate compressible portion deforms and stores a first energy charge as it decelerates and stops, in response the active grinding media accelerates in a second opposite direction under a first discharging force of the intermediate compressible portion toward an opposite second end of the tube until a second opposite one of the end impact surfaces impacts the second end of the tube, in response the intermediate compressible portion deforms and stores a second energy charge as it decelerates and stops, and in response the active grinding media accelerates back in the first direction under a second discharging force of the intermediate compressible portion toward the first end of the tube to complete an oscillatory cycle, wherein the oscillatory cycle is repeated a set number of times, and wherein during the oscillatory cycle the grinding body impacts the sample at accelerations and increased velocities to efficiently homogenize the sample, wherein the active grinding media body is configured for constraint in an axial orientation relative to the tube axis and within the tube, wherein the active grinding media body defines the flow-through opening in the axial orientation, wherein the active grinding media body has a length that is 100 percent to 400 percent of an inner diameter of the tube so that the active grinding media body and the flow-through opening are maintained in the axial orientation during homogenizing use.

11. The active grinding media of claim 10, wherein the active grinding media body has a width that is smaller than the tube inner diameter.

12. The active grinding media of claim 11, wherein the active grinding media body width is 50 percent to 80 percent of the tube inner diameter.

13. The active grinding media of claim 10, wherein the coil compression spring is hollow so the flow-through opening is unobstructed to enable passage therethrough of the sample during the oscillatory motion of the active grinding media within the tube.

14. A processing system comprising, in combination, the active grinding media and the tube of claim 10.

15. A method of using the active grinding media of claim 10 to homogenize the sample, comprising:

loading the sample and the active grinding media into the tube, then sealing the tube;

mounting the sealed tube containing the sample and the active grinding media to the high-speed laboratory homogenizer; and operating the high-speed laboratory homogenizer through one or more of the oscillatory cycles until the sample is homogenized.

16. The method of claim 15, wherein the step of operating the high-speed laboratory homogenizer includes generating a homogenizer stroke length that is the same as or greater than a length of the tube.

17. The method of claim 15, wherein the step of operating the high-speed laboratory homogenizer includes selecting a speed setting of between 0.1 m/s and 6.0 m/s.

* * * * *